United States Patent [19]

Koenig

[11] 4,392,483
[45] Jul. 12, 1983

[54] SOLAR COLLECTOR MEANS

[76] Inventor: Robert H. Koenig, 21 Barrington Pl., Huntington Hills, N.Y. 11746

[21] Appl. No.: 253,303

[22] Filed: Apr. 13, 1981

[51] Int. Cl.³ .............................................. F24J 3/02
[52] U.S. Cl. .................................. 126/450; 126/429; 126/449
[58] Field of Search .............................. 126/429–431, 126/432, 445, 446, 449, 450, DIG. 2, 417

[56] References Cited

U.S. PATENT DOCUMENTS

| | | | |
|---|---|---|---|
| 3,994,276 | 11/1976 | Pulver | 126/431 |
| 4,008,708 | 2/1977 | Hagarty | 126/445 |
| 4,212,291 | 7/1980 | Erb | 126/450 |
| 4,263,896 | 4/1981 | Zebuhr | 126/450 |
| 4,296,741 | 10/1981 | Harder | 126/446 |

FOREIGN PATENT DOCUMENTS 2357833 2/1978 United Kingdom ................ 126/445

Primary Examiner—James C. Yeung
Attorney, Agent, or Firm—James P. Malone

[57] ABSTRACT

A hot roof solar collector. A narrow modular matrix structure having a web or plate portion and lower and upper support rails connected to the web portion. These narrow modules are placed side by side adjacently on an insulating surface. A clear sheet member is mounted on the upper support rails. The space between the clear sheet and the web form a trap whereby when the collector surface is struck by sunlight, the matrix web heats up and the air in the passage below the matrix web will be heated. Hot air will flow up the passage if it is inclined, and it may be drawn into the building by a fan.

7 Claims, 7 Drawing Figures

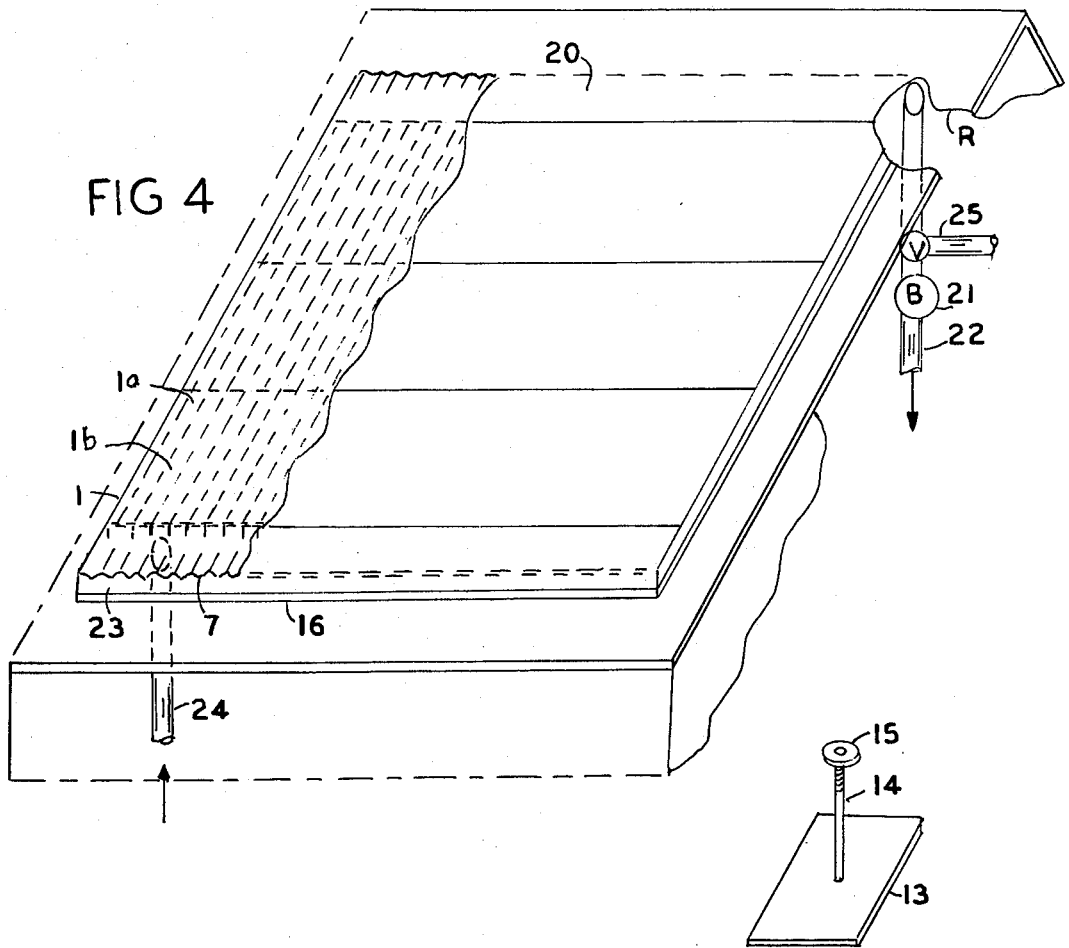
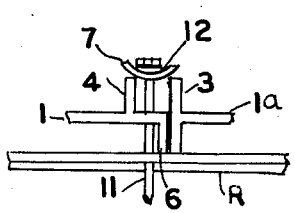
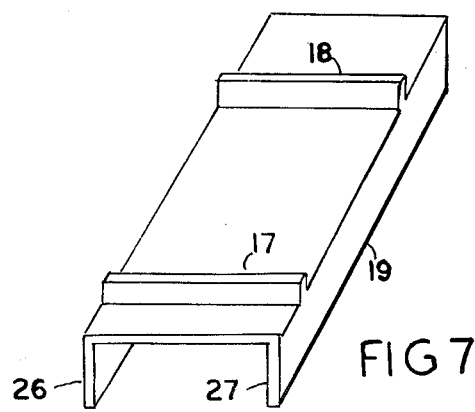

SOLAR COLLECTOR MEANS

TECHNICAL FIELD

This invention relates to solar collector means and more particular to such means having modular air passage collector means.

BACKGROUND ART

Conventional roof mounted solar collector devices are generally complex, bulky and expensive, and generally use circulating liquids which are heated by the solar radiation. These systems have problems due to potential freezing and leaks.

Present air heat collectors are bulky and are not generally used for large scale heat collection. Consequently, liquid cooled collectors are generally used.

Present air type collectors use a flat channel, one side of which is glazed with usually double glazing, and the opposite flat side is black and heats the air passing through the collector.

Because the air passes against the glazing, heat is lost unless double glazing is used and this is expensive and troublesome.

Installation is likewise troublesome and the units are bulky.

THE PRESENT INVENTION

The present invention provides simple modular members which are mounted on an existing roof surface. A plurality of members are mounted adjacently. A clear sheet is mounted on top of the modular members in order to trap solar radiation and heat the matrix and passage wherein the air is heated. The modular structure may be easily installed and is relatively simple and inexpensive and has a relatively thin profile. It provides insulation and protection to the roof in both winter and summer.

The present invention offers a simple means to collect the incident radiated heat energy falling over great areas of any roof.

The present invention permits easy construction on-site by simple side-by-side laying of these "modules" which are then held by the overlay of fiberglass glazing. Construction adhesive may be used.

When in place, the air passage between the web surface and the insulation on the roof acts as a heat generating air passage over the entire roof which is covered, and the vast BTU's can be captured and pulled down into the building which would otherwise be wasted.

In the summer time the system may be vented providing cooling ventilation on the roof.

More particularly, the invention comprises a modular matrix structure having a web portion, upper and lower legs, a clear member such as clear fiberglass or glass mounted on top of the matrix spaced from the web portion. An insulating layer is preferably mounted below the matrix members, and the air becomes heated as it moves between the matrix web and the insulator or roof surface.

The matrix members may be of one piece molded or extruded construction. They are modular for easy handling and are installed as adjacent flat pieces. The matrix member may be formed of various types of materials such as metal, ceramic, plastic or fiberglass impregnated plastic. The matrix may reach 250 degrees F., (123° C.).

OBJECTS OF THE INVENTION

Accordingly, a principal object of the invention is to provide new and improved solar collector means.

Another object of the invention is to provide new and improved roof or wall mounted solar collector means using air flow and does not require the use of liquids, and which can easily be applied to existing buildings.

Another object of the invention is to provide new and improved solar collector means comprising a modular matrix member having an air passage below it, and which is covered by glazing to trap solar radiation which heats up the matrix and the air in the passage.

Another object of the invention is to provide a new and improved solar collector means comprising a modular matrix member having an air passage below it, and which is covered by glazing to trap solar radiation and heat up the matrix and the air passing below it as well as above it.

Another object of the invention is to provide new and improved solar collector means comprising: a structure having a web portion, lower support means connected to the web portion, upper support means connected to the web portion, a clear member mounted on the upper support members, the web portion, the upper support members and the clear members forming a trap whereby when the clear member faces the sun, the air in the air passage will be heated and will flow up through the air passage. The air may be moved by a fan. The collector may be used vertically against a wall or horizontally as well as the preferable inclined mounting.

BRIEF DESCRIPTION OF THE DRAWINGS

These and other objects of the invention will be apparent from the following specification and drawings of which:

FIG. 4 is a perspective view of an embodiment of the invention mounted on a roof.

FIG. 5 is an enlarged detail view illustrating a method of fastening the device on the roof with simple screws.

FIG. 6 is an enlarged detail view illustrating an alternate fastening means.

FIG. 7 is a perspective view of an alternate form of the matrix.

BEST MODE OF THE INVENTION

Figure 1:
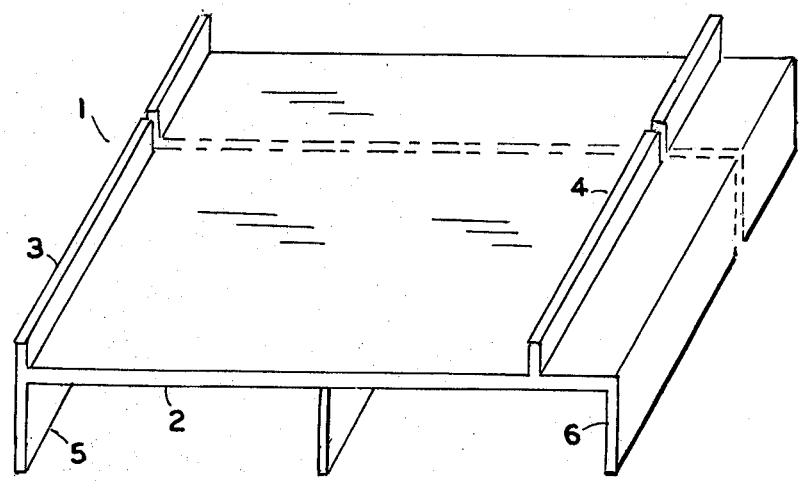
FIG. 1 is a perspective view of the modular matrix structure.

Referring to the drawings, FIG. 1 shows an isometric perspective view of the modular matrix member 1, which comprises a web or plate portion 2, the upper support members 3 and 4, lower support members 5 and 6. The support members 4 and 6 are offset to facilitate fastening to the roof as will be explained.

Figure 2:
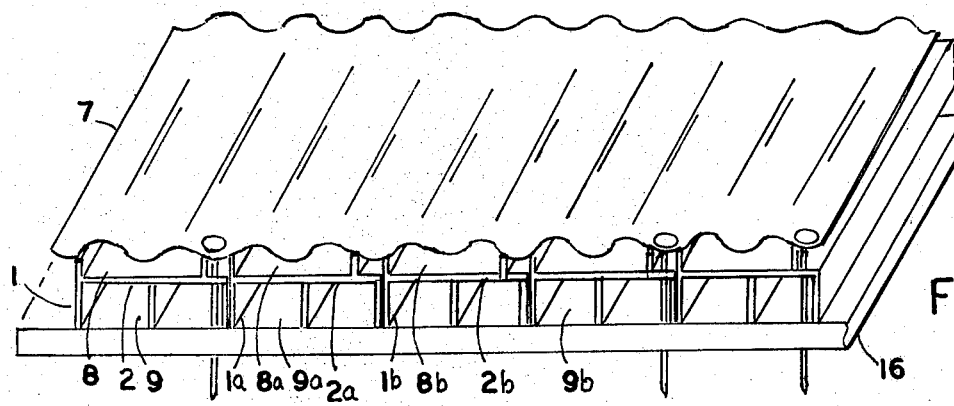
FIG. 2 is a perspective view of the modular matrix structure with a cover of corrugated clear fiberglass glazing.

FIG. 2 shows a perspective view of a plurality of modular members 1, 1a, 1b. The upper support members of the modular matrix members are covered with a glazing of clear corrugated fiberglass 7, which is commercially available and commonly used for covering patios, porches, etc. The matrix member 1 and the glazing member 7 form radiation trap spaces 8, 8a, 8b. When the structure is mounted on a roof at an elevated angle and facing the sun, the air in the passage 9, 9a, 9b, will be heated and will rise to the upper portion of the collector where the heated air may be collected and pumped down into the building for heating purposes, as will be explained.

Figure 3:
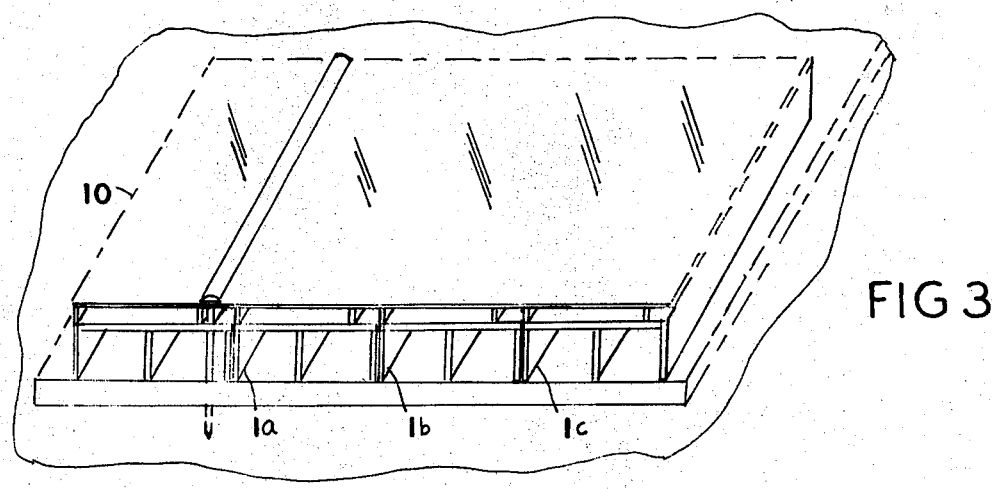
FIG. 3 is a perspective view of the matrix member covered with flat glass glazing.

FIG. 3 shows a perspective view of an embodiment of the invention comprising a plurality of matrix members 1, 1a, 1b, covered with plateglass 10 glazing.

FIG. 5 shows an enlarged detail view showing the method of fastening to the roof R. The fastening is made by a screw 11, through the matrix member 1 and the glazing member 7. A rubber or silicone washer 12 is preferably utilized to seal the connection against leaks. The upper support member 4 and the lower support member 6 are offset to accommodate the fastening screw. The dimensions of the matrix member 1 are chosen so that the corrugated fiberglass 7 will nest securely between the support members 3 and 4, when adjacent, as illustrated in FIG. 2.

FIG. 6 shows an alternate fastening means which may comprise a flat pad 13 which is adapted to be cemented to the roof. A rod or spike 14 is mounted onto the adhesive pad member which corresponds to the screw of FIG. 5. A clamp or nut 15, is mounted on top of the rod 14.

FIG. 4 shows an embodiment of the invention mounted on a roof R. A plurality of matrix members 1, 1a, 1b, etc., are mounted on an insulating board 16 which is mounted on the roof. The clear corrugated sheet 7 is mounted on the members 1, 1a, 1b., etc., as shown in FIG. 2. Since the members 1, 1a, etc., are modular, any predetermined area of the roof may be covered. Primary air passages are formed between plate or web portions 2, 2a., etc., of the matrix members and the insulation board 16, which may have a metal foil face.

Secondary air passages are formed between the glazing and the plate members 2, 2a., etc. Air enters the lower portion of the assembly and is heated by solar radiation so that it rises to the upper portion of the assemblies on the higher end of the roof. The passages at the upper end of the assembly are connected by a manifold or plenum 20 and is drawn down by the blower 21 into the living areas of the building via duct 22.

The lower end may be connected to draw air from the house by a similar manifold or plenum 23 which is connected to the interior portion of the house by the duct 24.

In the summer time the system may be vented as through valve damper V and vent pipe 25, or by any equivalent means such as shown in my co-pending application Ser. No. 246282 filed on Mar. 23, 1981 for VENTING MEANS FOR SOLAR COLLECTORS. This prevents attic and roof from overheating and can be used to draw hot air from the house.

The invention could also be used for housing photovoltaic cells in spaces under the glazing. The insulating board may be of conventional foam building material such as Thermax, Hi-R or other foam products. The matrix elements may be constructed of metal, vitreous, fiberglass, reclaimed fiber or ceramic materials such as commonly used in the roofing and siding industry. The double air passage construction of the present invention gives the advantageous insulating effect of double glazing in that the primary hot air flow is under the heated matrix web and not cooled by contact with the glass.

FIG. 7 shows an alternate form of matrix 19 having upper supports 17, 18, perpendicular to lower supports 26, 27.

The system of the present invention may be used with thermal mass storage systems such as rocks, slabs, etc., if desired.

The present invention is extremely light in weight, rugged, simple and easily adapted for non-professional do-it-yourself work. The present invention needs no plumbing and is inexpensive, it is thinner in profile than other type collectors and being in module form, permits any size or proportions.

The invention also adds roof insulation and has utility in both winter and summer and it can be used as a replacement surface of a leaking or otherwise defective roof. When vented in the summer time, the system can also provide thermosyphon ventilation of the building.

The present invention is not conspicuous on a roof and does not look like solar collectors but more like an interesting roof and can be made in any dark color.

The present hot roof solar space heating system has the following advantages and improvements.

Provides a solar heating system without the objections usually raised against present solar heating methods.

Provides an efficient low cost lightweight, permanent system suitable for small or large scale.

Provides simpler, cheaper solar heat collection with less installation expense and complexity than conventional systems.

Provides economical solar collection from existing roof areas which now give no heat gain.

Provides economical efficient solar collection without obtrusive looking panels, but instead provides larger surface blending with the existing structure in a more acceptable way.

Provides efficient solar heat collection by direct air transfer which has not the disadvantages of freezing or corroding as do some liquids.

Provides solar heat collection by direct air transfer which does not require heat exchangers to heat the air.

Provides a solar heating installation which can be fastened to an existing roof by adhesive.

Provides solar space heating which the do-it-yourself homeowner can install.

Provides a solar heating system which has the capability of housing photovoltaic cells for solar electrical generation in addition to the solar heat energy.

Provides a solar heating system primarily for hot air, but which can easily accommodate water heating tubes in passages between the glazing and the matrix. Extruded rubber collector tubes (Solarol) adapts perfectly into this invention.

Provides heat collection system which permits economical large scale collection of abundant BTU'S of heat.

Provides solar heat collection which utilizes single glazing but which has the efficiency of double glazing without the complexity or cost.

Provides a collector which permits easy summer venting to keep the components cool thus prolonging their life as also shown in my co-pending application Ser. No. 246282 filed on Mar. 23, 1981 for VENTING MEANS FOR SOLAR COLLECTOR.

Provides a collector which keeps the roof cooler by reflecting heat away and by convecting heated air from the roof.

Provides a collector system which permits summer siphoning of indoor air to the outside—similar to the old English Parliament buildings where gas flames were used for ventilation.

It is claimed:

1. Solar collector means comprising:

a modular rigid structure having a web portion, lower support means connected to the web portion, upper support means connected to the web portion, a clear corrugated member mounted on the upper support members, the web portion, the upper support members and the clear member forming a trap, said structure being a unitary molded piece with said upper support means being chosen to nest with said clear corrugated fiberglass, whereby when the structure is mounted on an inclined roof it forms an air passage between the web and the roof and with the clear member facing the sun, the air in the air passage below the web will be heated and flow up through the air passage.

2. Apparatus as in claim 1 having insulation layer means mounted below the lower support means.

3. Apparatus as in claim 1 wherein said structure is constructed of dark material to absorb the heat from the sun.

4. Apparatus as in claim 1 wherein the clear member is clear corrugated fiberglass.

5. Apparatus as in claim 1 wherein the clear member is plate glass.

6. Apparatus as in claim 3 wherein the said structure is a unitary molded piece.

7. Apparatus as in claim 1 wherein the clear member is of flat clear plastic.

* * * * *